(12) United States Patent
Erenrich et al.

(10) Patent No.: US 10,956,431 B2
(45) Date of Patent: Mar. 23, 2021

(54) SYSTEM AND METHOD FOR ASSOCIATING RELATED RECORDS TO COMMON ENTITIES ACROSS MULTIPLE LISTS

(71) Applicant: Palantir Technologies Inc., Palo Alto, CA (US)

(72) Inventors: Daniel Erenrich, Mountain View, CA (US); Christian Tessier-Lavigne, Palo Alto, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 118 days.

(21) Appl. No.: 16/281,498

(22) Filed: Feb. 21, 2019

(65) Prior Publication Data
US 2019/0188200 A1    Jun. 20, 2019

Related U.S. Application Data

(63) Continuation of application No. 15/339,300, filed on Oct. 31, 2016, now Pat. No. 10,242,072, which is a
(Continued)

(51) Int. Cl.
*G06F 16/00* (2019.01)
*G06F 16/2458* (2019.01)
(Continued)

(52) U.S. Cl.
CPC ........ *G06F 16/2462* (2019.01); *G06F 16/215* (2019.01); *G06F 16/2465* (2019.01);
(Continued)

(58) Field of Classification Search
None
See application file for complete search history.

(56) References Cited

U.S. PATENT DOCUMENTS 8,386,377 B1 * 2/2013 Xiong .................... G06Q 20/04
705/38
8,914,366 B1 * 12/2014 Li ........................ G06K 9/6218
707/737

(Continued)

FOREIGN PATENT DOCUMENTS

EP            3035214      6/2016
WO     WO 2012/061162     5/2012

OTHER PUBLICATIONS

Gill et al., "Computerised Linking of Medical Records: Methodological Guidelines,".
(Continued)

*Primary Examiner* — Bai D Vu
(74) *Attorney, Agent, or Firm* — Sheppard Mullin Richter & Hampton LLP

(57) ABSTRACT

Computer implemented systems and methods are disclosed for associating records across lists, wherein the lists include a plurality of records and the plurality of records is associated with a respective entity. In accordance with some embodiments, the systems and methods further comprise grouping one or more records from a first list into a first group based on fields of the records in the first list, grouping one or more records from a second list into a second group based on fields of the records in the second list, pairing a record from the first group with a record from the second group, assessing each pair of records based on an evaluation of the respective pair according to fields of the pair, and associating records from the first group and records of the second group with an entity based on the assessment.

20 Claims, 8 Drawing Sheets

Related U.S. Application Data continuation of application No. 14/571,098, filed on Dec. 15, 2014, now Pat. No. 9,483,546.

(51) Int. Cl.
    *G06F 16/215*      (2019.01)
    *G06F 16/28*      (2019.01)
    *G06F 16/2455*      (2019.01)
    *G06F 16/2457*      (2019.01)

(52) U.S. Cl.
    CPC .. *G06F 16/24558* (2019.01); *G06F 16/24575* (2019.01); *G06F 16/285* (2019.01)

(56) References Cited

U.S. PATENT DOCUMENTS

| | | | |
|---|---|---|---|
| 9,483,546 B2 | 11/2016 | Erenrich et al. | |
| 2003/0126102 A1* | 7/2003 | Borthwick | G06F 16/215 706/21 |
| 2005/0273452 A1 | 12/2005 | Molloy et al. | |
| 2006/0080283 A1* | 4/2006 | Shipman | H04L 61/1576 |
| 2007/0162454 A1* | 7/2007 | D'Albora | G06Q 10/10 |
| 2007/0192122 A1* | 8/2007 | Routson | G06F 16/211 705/1.1 |
| 2007/0282827 A1 | 12/2007 | Levin | |
| 2008/0208735 A1* | 8/2008 | Balet | G06F 16/288 705/39 |
| 2009/0094270 A1* | 4/2009 | Alirez | G06F 16/29 |
| 2009/0157732 A1* | 6/2009 | Hao | H04M 3/53333 |
| 2009/0313463 A1* | 12/2009 | Pang | G06F 21/6254 713/150 |
| 2009/0319515 A1 | 12/2009 | Minton et al. | |
| 2011/0029477 A1* | 2/2011 | Tengli | G06N 20/00 706/54 |
| 2012/0059853 A1* | 3/2012 | Jagota | G06F 16/95 707/780 |
| 2012/0089606 A1 | 4/2012 | Eshwar et al. | |
| 2012/0226590 A1* | 9/2012 | Love | G06Q 10/10 705/30 |
| 2012/0278263 A1* | 11/2012 | Borthwick | G06N 5/025 706/12 |
| 2013/0124474 A1* | 5/2013 | Anderson | G06F 16/24534 707/634 |
| 2014/0032556 A1* | 1/2014 | Bayliss | G06F 16/285 707/737 |
| 2014/0137262 A1 | 5/2014 | Stofberg et al. | |
| 2014/0222793 A1* | 8/2014 | Sadkin | G06F 16/24578 707/723 |
| 2014/0279757 A1* | 9/2014 | Shimanovsky | G06F 16/29 706/12 |
| 2014/0280340 A1* | 9/2014 | Rabolt | G06F 16/245 707/775 |
| 2014/0324790 A1 | 10/2014 | Ray et al. | |
| 2014/0324906 A1 | 10/2014 | Ray et al. | |
| 2014/0358829 A1* | 12/2014 | Hurwitz | G06F 16/215 706/12 |
| 2017/0046400 A1 | 2/2017 | Erenrich et al. | |

OTHER PUBLICATIONS

Winkler, William E., "Bureau of the Census Statistical Research Division Record Linkage Software and Methods for Merging Administrative Lists," Statistical Research Report Series No. RR2001/03, Jul. 23, 2001, https://www.census.gov/srd/papers/pdf/rr2001-03.pdf, retrieved on Mar. 9, 2016.

Steorts et al., "A Comparison of Blocking Methods for Record Linkage", Sep. 17, 2014, Network and Parallel Computing; [Lecture Notes in Computer Science; Lect.Notes Computer], Springer International Publishing, Cham, pp. 253-268, ISBN: 978-3-642-35622-3.

Official Communication for U.S. Appl. No. 15/339,300 dated Apr. 10, 2018.

Official Communication for European Patent Application No. 15200073.3 dated Sep. 27, 2018.

Official Communication for U.S. Appl. No. 15/339,300 dated Dec. 14, 2017.

Official Communication for European Patent Application No. 15200073.3 dated Mar. 30, 2016.

\* cited by examiner

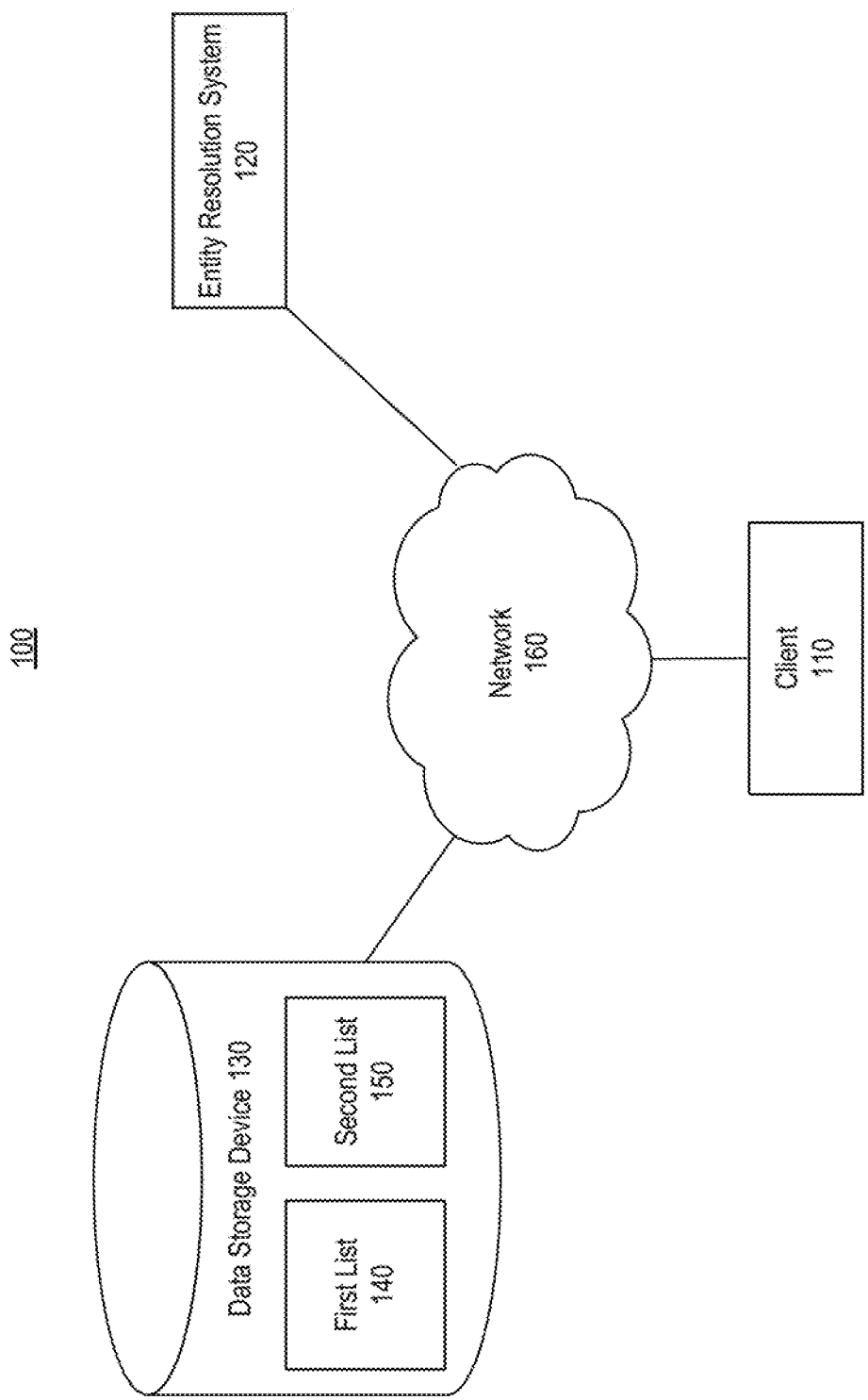

| | Entity ID | | | Entity Location | | | | Phone Number | Email |
|---|---|---|---|---|---|---|---|---|---|
| Number | Name | Code | State | City | Zip Code | Street Address | | | |
| 1 | User 1 | EID 1 | California | Palo Alto | 12345 | 123 Mail St. | | 1234567899 | PA@email.com |
| 2 | User 2 | EID 2 | California | San Francisco | 22222 | 987 Hill Drive | | (987) 654-3210 | SF@email.com |
| 3 | Unknown | CE 002 | Cali | Palo Alto | 12345 | 777 Tech Street | | (123) 456-7899 | Cali@email.com |
| 4 | User 1 | EID 4 | California | San Diego | 333333 | 111 Bio Circle | | 7134432109 | User1@email.com |
| 5 | User 3 | Unknown | Unknown | Unknown | Unknown | Unknown | | 9876543210 | User3@email.com |
| . | . | . | . | . | . | . | | . | . |
| . | . | . | . | . | . | . | | . | . |
| . | . | . | . | . | . | . | | . | . |
| 100,000,000 | User N | EID 0 | TX | Dallas | 76262 | 613 Lovers Lane | | (444) 111-3301 | Dallas@TX.com |

FIG. 2

| | | Consuming Entity Location | | | | Provisioning Entity | Provisioning Entity Location | | | | Type of Provisioning Entity (e.g., name or code) | Interaction Amount (e.g., in Dollars) | Type of Interaction | |
|---|---|---|---|---|---|---|---|---|---|---|---|---|---|---|---|
| Number | Consuming Entity ID (e.g., name or code) | State | City | Zip Code | Street Address | (e.g., name or code) | State | City | Zip Code | Street Address | | | Date | Time |
| 1 | User 1 | California | Palo Alto | 94304 | 123 Main St | PE001 | California | Palo Alto | 94304 | 234 University Ave | Gas Station | 74.56 | 2013/11/23 | 16:32 |
| 2 | CE002 | California | Sunnyvale | 94085 | 123 Murphy St | Merchant 2 | Unknown | Unknown | Unknown | Unknown | Supermarket | 23.56 | 2013/10/15 | 11:23 |
| 3 | User 1 | California | Palo Alto | 94304 | 123 Main St | Merchant 2 | Unknown | Unknown | Unknown | Unknown | TPE123 | 32.11 | 2013/11/21 | 12:00 |
| 4 | User 3 | California | San Francisco | 94102 | 1000 Lombard St | Merchant 3 | California | San Francisco | 94102 | 123 Market St | Coffee Shop | 8.97 | 2013/10/20 | 17:05 |
| 5 | User 3 | Unknown | Unknown | Unknown | Unknown | Merchant 3 | California | San Francisco | 94102 | 123 Market St | Coffee Shop | 5.34 | 2013/11/03 | 8:03 |
| 50,000,000,000 | User N | California | Beverly Hills | 90210 | 123 Wilshire Blvd | Merchant N | California | Beverly Hills | 90210 | 789 Wilshire Blvd | TPE789 | 69.23 | 2013/10/26 | 14:00 |

FIG. 3

SYSTEM AND METHOD FOR ASSOCIATING RELATED RECORDS TO COMMON ENTITIES ACROSS MULTIPLE LISTS

REFERENCE TO RELATED APPLICATION

This application is a continuation of U.S. Non-Provisional application Ser. No. 15/339,300, filed on Oct. 31, 2016, which is a continuation of U.S. Non-Provisional application Ser. No. 14/571,098, filed on Dec. 15, 2014, the content of which is incorporated by reference in its entirety into the present disclosure.

BACKGROUND

Obtaining relevant information from multiple large lists of records can be relatively straightforward in some situations. One particular situation is when records in separate lists are similar and it is desired to obtain information in the records having a particular value or character string in a particular field. The fields at issue can be isolated using filtering functions of data interfacing software and the desired information retrieved. By using combinations of filtering functions, more sophistication can be provided to the way in which fields are identified for comparison. Once compared, some records can be isolated based on the comparisons on the particular fields. The isolated records can then be aggregated so as to provide a report including all the records that together constitute the desired information.

But in order to recognize common records, such filtering functions rely on identical fields across the records. In the real world, lists may have no identical fields across the records, despite those records being related, or can have identical fields in a relatively small number of fields (or parts of fields) such that existing filtering functions are unable to provide isolation of the desired records from other records. For example, such problems can occur when a list has records originating from a number of different sources. This problem only worsens as the size of lists becomes larger (e.g., a list having billions of records), in terms of the number of records present. With the sizes of lists in the real world increasing as time progresses, this problem is expected to worsen over time.

BRIEF DESCRIPTION OF THE DRAWINGS

Reference will now be made to the accompanying drawings, which illustrate exemplary embodiments of the present disclosure and in which:

FIG. 1 is a block diagram of an exemplary system for associating related records to common entities across multiple lists, consistent with embodiments of the present disclosure.

FIG. 2 is a block diagram of an exemplary first list, consistent with embodiments of the present disclosure.

FIG. 3 is a block diagram of an exemplary second list, consistent with embodiments of the present disclosure.

DETAILED DESCRIPTION OF EXEMPLARY EMBODIMENTS

Figure 4:
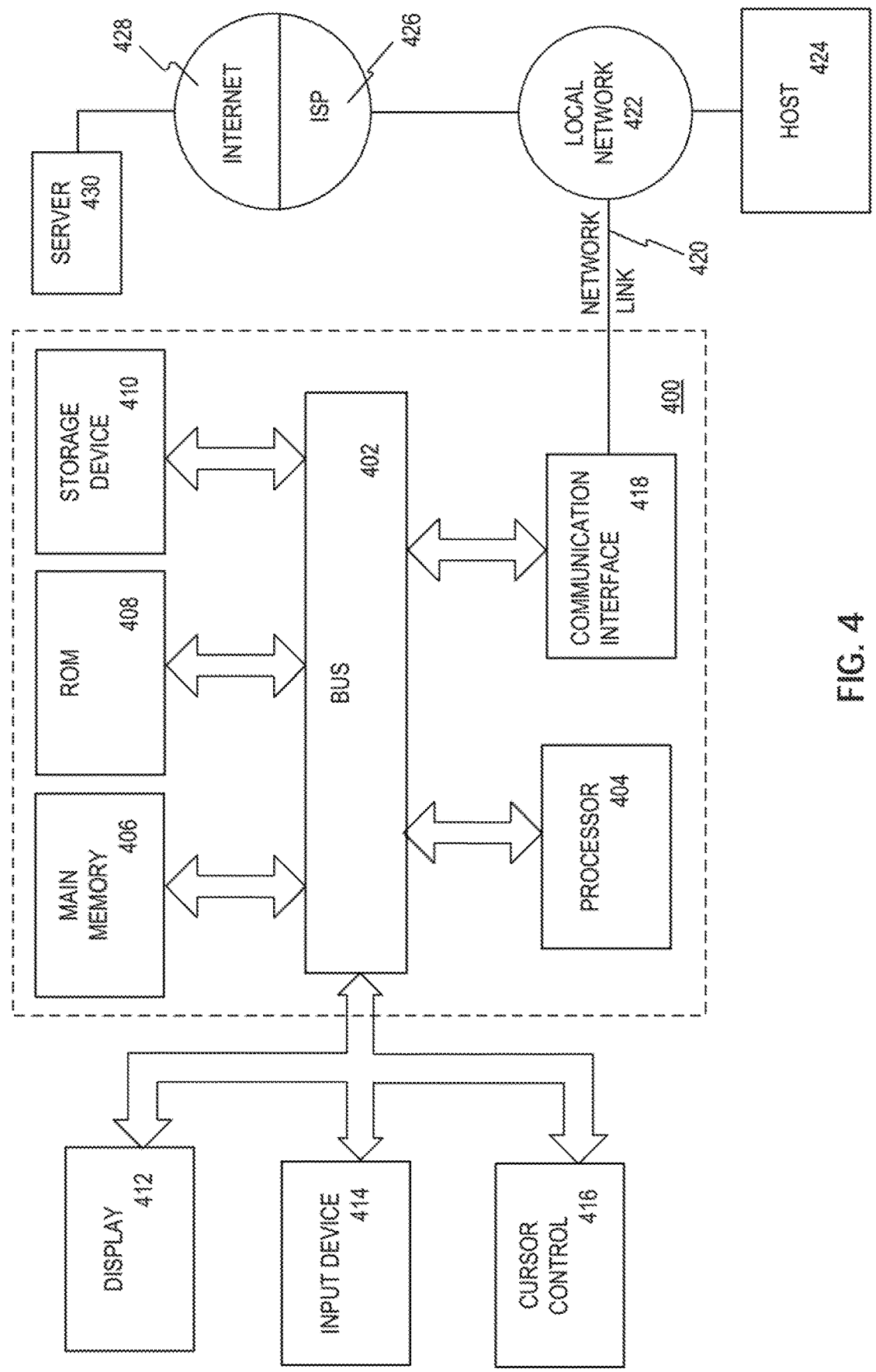
FIG. 4 is a block diagram of an exemplary computer system, consistent with embodiments of the present disclosure.

Reference will now be made in detail to exemplary embodiments, the examples of which are illustrated in the accompanying drawings. Whenever possible, the same reference numbers will be used throughout the drawings to refer to the same or like parts.

Embodiments describe methods, systems, and non-transitory computer-readable mediums for associating related records to common entities across multiple lists. As stated previously, the one or more lists of data may be large, for example having billions of records. Some embodiments of the application can associate records that may not have useful identical fields while still excluding unrelated records, resulting in the association of records that relate to a common entity. Moreover, some embodiments of this application allow multiple lists of records that have no identical fields, but belong to the same common entity, to be associated to the common entity.

Further, some embodiments reduce the number of comparisons between multiple lists. With prior techniques, when a user desired to compare fields in multiple lists, every record in each list needed to be compared to every record in the every other list. With some embodiments of this application, merely relevant records in each list are compared together.

For example, assuming a first list comprises records that identify a plurality of entities by a distinct ID field and a second list identifies records from a plurality of sub-entities, each with a distinct ID, of the plurality of entities. In some embodiments, a system can associate all of the sub-entities of the second list with the entities of the first list.

FIG. 1 is a block diagram of an exemplary system 100 for associating related records to common entities across multiple lists, consistent with embodiments of the present disclosure. As shown, exemplary system 100 includes a client 110, an entity resolution system 120, and a data storage device 130, which includes a first list 140 and a second list 150. Further, client 110, entity resolution system 120, and data storage device 130 can communicate over a network 160.

First list 140 and second list 150 can include data records, each having a number of fields. Examples of first list 140 and second list 150 are shown in FIGS. 2 and 3, respectively. Data storage device 130, however, does not need to include only first list 140 and second list 150. Data storage device 130 can include any numbers of lists, including only one list that would represent both first list 140 and second list 150. Also, exemplary system 100 can include more than one data storage device 130. In the case of more than one data storage device 130, first list 140 and second list 150 can be in different data storage devices or can be in the same data storage device.

First list 140 and second list 150 can be any type of list, including a data structure, or part of a data structure, a database, or part of a database. Some examples of data structures are arrays, tuples, hash tables, sets, graphs, queues, stacks, etc. An example of a database is a Relational Database Management System (RDBMS) that stores the transaction data as rows in relational tables. Alternatively, first list 140 and second list 150 can be a column-oriented database management system that stores data as sections of columns of data rather than rows of data. This column-oriented DBMS can have advantages, for example, for data warehouses, customer relationship management systems, and library card catalogues, and other ad hoc inquiry systems where aggregates are computed over large numbers of similar data items. A column-oriented DBMS can be more efficient than an RDBMS when an aggregate needs to be computed over many rows but only for a notably smaller subset of all columns of data, because reading that smaller subset of data can be faster than reading all data. A column-oriented DBMS can be designed to efficiently return data for an entire column, in as few operations as possible. A column-oriented DBMS can store data by serializing each column of data of first list 140 and second list 150. First list 140 and second list 150 do not need to be the same type of list.

Client 110 can include one or more software applications configured to present data and translate user inputs into requests for record association by entity resolution system 120. Client 110 can also run on entity resolution system 120. In any event, a user would interact with exemplary system 100 through client 110. And while client 110 is shown in FIG. 1, it is appreciated that multiple clients can interact with data storage device 130 and entity resolution system 120.

Entity resolution system 120 can be a computing system configured to associate related records to common entities across multiple lists. For example, entity resolution system 120 can be a computer system configured to execute software or a set of programmable instructions that collect or receive records from different lists and process those records to associate related records to common entities that may not have useful identical fields while still excluding unrelated entity records, resulting in the identification of entity records that relate to a common entity. In some embodiments, entity resolution system 120 can be implemented using a computer system 400, as shown in FIG. 4 and described below.

Entity resolution system 120 can include one or more computing devices (e.g., server(s)), memory storing data and/or software instructions (e.g., database(s), memory device(s), etc.), and other known computing components. According to some embodiments, entity resolution system 120 can include one or more networked computers that execute processing in parallel or use a distributed computing architecture. Entity resolution system 120 can be configured to communicate with one or more components of system 100, and it can be configured to provide entity resolution information via an interface(s) accessible by users over a network (e.g., the Internet). For example, entity resolution system 120 can include a web server that hosts a web page accessible through network 160. In some embodiments, entity resolution system 120 can include an application server configured to provide data to one or more client applications executing on computing systems connected to entity resolution system 120 via network 160.

Entity resolution system 120 can read data from multiple lists (e.g., first list 140 and second list 150) from one or more data storage devices (e.g., data storage device 130. Entity resolution system 120 can store resolution data on at least one of client 110, entity resolution system 120, data storage device 130, first list 140, and second list 150.

Entity resolution system 120 can use the resolution data to associate records retrieved from first list 140 and second list 150. Entity resolution system 120 can also pair the records from first list 140 and second list 150. Entity resolution system 120 can use the pairs to provide insights about a particular entity.

FIG. 2 is a block diagram of an exemplary first list 140, consistent with embodiments of the present disclosure. First list 140 can store records associated with entities. As shown in FIG. 2, first list 140 can include a very large number of records. For example, first list 140 includes 100 billion records. While each record of first list 140 is depicted as a separate row in FIG. 2, it will be understood that each such record can be represented in other ways, for example, by a column or any other technique in the art. Also, first list 140 can include duplicate entities or duplicate sub-entities, as shown in rows 201 and 204. Each record can include several categories of information. For example, first list 140 includes: number category 210; entity identification category 220; entity location category 230; phone number category 240; and email category 250. It will be understood that FIG. 2 is merely exemplary and that first list 140 can include more or less categories of information associated with a record.

Number category 210 can uniquely identify each record of first list 140. For example, first list 140 depicts 100 billion records as illustrated by number category 210 of the last row of first list 140 as 100,000,000,000. It will be understood that this disclosure is not limited to any number of records and further that this disclosure can extend to a list with more or less than 100 billion records. It is also appreciated that number category 210 need not exist in first list 140.

Entity identification category 220 can identify an entity. In some embodiments, entity identification category 220 can represent the entity identification by providing at least one of: a name of the entity (e.g., name sub-category 222; User 1 for record 201; unknown for record 203); a code uniquely identifying the entity (e.g., code sub-category 224; EID1 for record 201; unknown for record 205). For example, the identifiers under entity identification category 220 can be a credit card number that can identify a person or a family, a social security number that can identify a person, a phone number or a MAC address associated with a cell phone of a user or family, or any other identifier.

Entity location category 230 can represent location information of the entity. In some embodiments, entity location category 230 can represent the location information by providing at least one of: a state of residence of the entity (e.g., state sub-category 232; California for record 201; unknown for record 205); a city of residence of the entity (e.g., city sub-category 234; Palo Alto for record 201; unknown for record 205); a zip code of residence of the entity (e.g., zip code sub-category 236; 12345 for record 201; unknown for record 205); and a street address of residence of the entity (e.g., street address sub-category 238; 123 Main Street for record 201; unknown for record 205).

Phone number category 240 can identify an entity's phone number. The phone number can be a character sequence. The character sequence can comprise of numbers, letters, spaces, or symbols, which can include "(," ")," ".," and "-." For example, phone number category 240 of record 201 is 1234567899, while phone number category 240 of record 302 is (987) 654-3210. Also, the phone number can be unknown. The phone number provides a way for the entity to be contacted over a phone. It would be recognized by a person of ordinary skill in the art that a phone number is not only for connecting over a phone.

Email category 250 can identify an entity's email address. The email address should include a sequence of numbers and letters followed by an "@" symbol. After the "@" symbol will be another sequence of numbers and letters followed by a period and another sequence of numbers and letters. For example, email category 250 of record 201 is sf@email.com. The email address can be unknown. The email address provides a way for the entity to be contacted over the internet. It would be recognized by a person of ordinary skill in the art that an email address is not only for connecting over the internet.

FIG. 3 is a block diagram of an exemplary second list 150, consistent with embodiments of the present disclosure. Second list 150 can store data records associated with records involving multiple entities. As shown in FIG. 3, second list 150 can include data associated with a very large number of records associated with multiple entities. For example, second list 150 can include 50 billion records. While each record of second list 150 is depicted as a separate row in FIG. 3, it will be understood that each such record can be represented in other ways, for example, by a column or any other technique in the art. Each record can include several categories of information. For example, the several categories can include, number category 310; consuming entity identification category 320; consuming entity location category 330; provisioning entity identification category 340; provisioning entity location category 350; type of provisioning entity category 360; record amount category 370; and time of record category 380. It will be understood that FIG. 3 is merely exemplary and that second list 150 can include more or less categories of information associated with a record.

Number category 310 can uniquely identify each record of second list 150. For example, second list 150 depicts 50 billion record as illustrated by number category 310 of the last row of second list 150 as 50,000,000,000. In FIG. 3, each row depicting a record can be identified by an element number. For example, record number 1 can be identified by element 301; record number 2 can be identified by element 302; and so on such that record 50,000,000,000 can be identified by 399B. It will be understood that this disclosure is not limited to any number of records and further that this disclosure can extend to lists with more or less than 50 billion records. It is also appreciated that number category 310 need not exist in second list 150.

Consuming entity identification category 320 can identify a consuming entity. In some embodiments, consuming entity identification category 320 can represent a name (e.g., User 1 for record 301; User N for record 399B) of the consuming entity. Alternatively, consuming entity identification category 320 can represent a code uniquely identifying the consuming entity (e.g., CE002 for record 302). For example, the identifiers under the consuming entity identification category 320 can be a credit card number that can identify a person or a family, a social security number that can identify a person, a phone number or a MAC address associated with a cell phone of a user or family, or any other identifier.

Consuming entity location category 330 can represent location information of the consuming entity. In some embodiments, consuming entity location category 330 can represent the location information by providing at least one of: a state of residence (e.g., state sub-category 332; California for element 301; unknown for record 305) of the consuming entity; a city of residence (e.g., city sub-category 334; Palo Alto for record 301; unknown for record 305) of the consuming entity; a zip code of residence (e.g., zip code sub-category 336; 94304 for record 301; unknown for record 305) of the consuming entity; and a street address of residence (e.g., street address sub-category 438; 123 Main St. for record 301; unknown for record 305) of the consuming entity.

Provisioning entity identification category 340 can identify a provisioning entity (e.g., a merchant or a coffee shop). In some embodiments, provisioning entity identification category 340 can represent a name of the provisioning entity (e.g., Merchant 2 for record 302). Alternatively, provisioning entity identification category 340 can represent a code uniquely identifying the provisioning entity (e.g., PE001 for record 301). Provisioning entity location category 350 can represent location information of the provisioning entity. In some embodiments, provisioning entity location category 350 can represent the location information by providing at least one of: a state where the provisioning entity is located (e.g., state sub-category 352; California for record 301; unknown for record 302); a city where the provisioning entity is located (e.g., city sub-category 354; Palo Alto for record 301; unknown for record 302); a zip code where the provisioning entity is located (e.g., zip code sub-category 356; 94304 for record 301; unknown for record 302); and a street address where the provisioning entity is located (e.g., street address sub-category 358; 234 University Ave. for record 301; unknown for record 302).

Type of provisioning entity category 360 can identify a type of the provisioning entity involved in each record. In some embodiments, type of provisioning entity category 360 of the provisioning entity can be identified by a category name customarily used in the industry (e.g., Gas Station for record 301) or by an identification code that can identify a type of the provisioning entity (e.g., TPE123 for record 303). Alternatively, type of the provisioning entity category 360 can include a merchant category code ("MCC") used by credit card companies to identify any business that accepts one of their credit cards as a form of payment. For example, MCC can be a four-digit number assigned to a business by credit card companies (e.g., American Express™, Master-Card™, VISA™) when the business first starts accepting one of their credit cards as a form of payment.

In some embodiments, type of provisioning entity category 360 can further include a sub-category (not shown in FIG. 3), for example, type of provisioning entity sub-category 361 that can further identify a particular sub-category of provisioning entity. For example, an record can comprise a type of provisioning entity category 360 as a hotel and type of provisioning entity sub-category 361 as either a bed and breakfast hotel or a transit hotel. It will be understood that the above-described examples for type of provisioning entity category 360 and type of provisioning entity sub-category 361 are non-limiting and that second list 150 can include other kinds of such categories and sub-categories associated with an record.

Record amount category 370 can represent a transaction amount (e.g., $74.56 for record 301) involved in each record. Time of record category 380 can represent a time at which the record was executed. In some embodiments, time of record category 380 can be represented by a date (e.g., date sub-category 382; Nov. 23, 2013, for record 301) and time of the day (e.g., time sub-category 384; 10:32 AM local time for record 301). Time sub-category 384 can be represented in either military time or some other format. Alternatively, time sub-category 384 can be represented with a local time zone of either provisioning entity location category 350 or consuming entity location category 330.

In some embodiments, each record data can include categories of information including (not shown in FIG. 3), for example, consuming entity loyalty membership category, consuming entity credit card type category, consuming entity age category, consuming entity gender category, consuming entity income category, consuming entity with children category, product information category, and service information category.

Consuming entity loyalty membership category can represent whether the consuming entity is part of a loyalty membership program associated with a provisioning entity. For example, consuming entity loyalty membership category can represent that the consuming entity is a member of one of Costco™ membership programs including Goldstar Member™, Executive Member™, and Business Member™. Consuming entity credit card type category can represent the type of credit card used by the consuming entity for a particular record. For example, consuming entity credit card type category can represent that the credit card used by the consuming entity for that particular record can be one either American Express™ MasterCard™, VISA™, or Discover™ credit cards. In some embodiments, consuming entity credit card type category can represent a kind of MasterCard™ (e.g., Gold MasterCard™ or Platinum MasterCard™) used for a particular record.

In some embodiments, consuming entity demographic information can be stored in each record. For example, consuming entity demographic information can include at least one of: consuming entity age category, consuming entity gender category, consuming entity income category, and consuming entity with children category. In some embodiments, consuming entity age category can represent age information associated with the consuming entity; consuming entity gender category can represent gender information (e.g., Male or Female) associated with the consuming entity; consuming entity income category can represent income information (e.g., greater than $100,000 per year) associated with the consuming entity; and consuming entity with children category can represent whether the consuming entity has any children under 18 or not. For example, if the consuming entity has children under 18, a positive indication can be stored and if the consuming entity does not has children under 18, a negative indication can be stored. In some embodiments, consuming entity with children category can store information representing a number of children associated with the consuming entity.

Product information category can represent information associated with a product that is involved in an record. For example, product information category can represent that the product involved in the record is a particular type of product based on a stock keeping unit ("SKU") of the product. In some embodiments, the product's SKU can be unique to a particular provisioning entity involved in that particular record. Alternatively, product information category can represent the product involved in the record with a at least one of a Universal Product Code, International Article Number, Global Trade Item Number, and Australian Product Number. Service information category can represent information associated with a service that is involved in an record. For example, service information category can represent that the service involved in the record is a particular type of service based on an SKU of the service. It will be appreciated that an SKU can uniquely represent either a product or a service. Some examples of services can be warranties, delivery fees, installation fees, and licenses.

FIG. 4 s a block diagram of an exemplary computer system 400, consistent with embodiments of the present disclosure. Components of system 100, such as entity resolution system 120, and client 110, can include the architecture based on or similar to that of computer system 400.

As illustrated in FIG. 4, computer system 400 can include a bus 402 or other communication mechanism for communicating information, and one or more hardware processors 404 (denoted as processor 404 for purposes of simplicity) coupled with bus 402 for processing information. Hardware processor 404 can be, for example, one or more general-purpose microprocessors or it can be a reduced instruction set of one or more microprocessors.

Computer system 400 also includes a main memory 406, such as a random access memory (RAM) or other dynamic storage device, coupled to bus 402 for storing information and instructions to be executed by processor 404. Main memory 406 also can be used for storing temporary variables or other intermediate information during execution of instructions to be executed by processor 404. Such instructions, after being stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or USB thumb drive (Flash drive), etc. is provided and coupled to bus 402 for storing information and instructions.

Computer system 400 can be coupled via bus 402 to a display 412, such as a cathode ray tube (CRT), liquid crystal display, or touch screen, for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. The input device typically has two degrees of freedom in two axes, a first axis (for example, x) and a second axis (for example, y), that allows the device to specify positions in a plane. In some embodiments, the same direction information and command selections as cursor control can be implemented via receiving touches on a touch screen without a cursor.

Computing system 400 can include a user interface module to implement a graphical user interface that can be stored in a mass storage device as executable software codes that are executed by the one or more computing devices. This and other modules can include, by way of example, components, such as software components, object-oriented software components, class components and task components, processes, functions, fields, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module can be compiled and linked into an executable program, installed in a dynamic link library, or written in an interpreted programming language such as, for example, BASIC, Perl, or Python. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. Generally, the modules described herein refer to logical modules that can be combined with other modules or divided into sub-modules despite their physical organization or storage.

Computer system 400 can implement the techniques described herein using customized hard-wired logic, one or more ASICs or FPGAs, firmware and/or program logic which in combination with the computer system causes or programs computer system 400 to be a special-purpose machine. According to some embodiments, the operations, functionalities, and techniques and other features described herein are performed by computer system 400 in response to processor 404 executing one or more sequences of one or more instructions contained in main memory 406. Such instructions can be read into main memory 406 from another storage medium, such as storage device 410. Execution of the sequences of instructions contained in main memory 406 causes processor 404 to perform the process steps described herein. In alternative embodiments, hard-wired circuitry can be used in place of or in combination with software instructions.

The term "non-transitory media" as used herein refers to any non-transitory media storing data and/or instructions that cause a machine to operate in a specific fashion. Such non-transitory media can comprise non-volatile media and/or volatile media. Non-volatile media can include, for example, optical or magnetic disks, such as storage device 410. Volatile media can include dynamic memory, such as main memory 406. Common forms of non-transitory media can include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from, but can be used in conjunction with, transmission media. Transmission media can participate in transferring information between storage media. For example, transmission media can include coaxial cables, copper wire and fiber optics, including the wires that comprise bus 402. Transmission media can also take the form of acoustic or light waves, such as those generated during radio-wave and infra-red data communications.

Various forms of media can be involved in carrying one or more sequences of one or more instructions to processor 404 for execution. For example, the instructions can initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 can optionally be stored on storage device 410 either before or after execution by processor 404.

Computer system 400 can also include a communication interface 418 coupled to bus 402. Communication interface 418 can provide a two-way data communication coupling to a network link 420 that can be connected to a local network 422. For example, communication interface 418 can be an integrated services digital network (ISDN) card, cable modem, satellite modem, or a modem to provide a data communication connection to a corresponding type of telephone line. As another example, communication interface 418 can be a local area network (LAN) card to provide a data communication connection to a compatible LAN. Wireless links can also be implemented. In any such implementation, communication interface 418 can send and receives electrical, electromagnetic or optical signals that carry digital data streams representing various types of information.

Network link 420 can typically provide data communication through one or more networks to other data devices. For example, network link 420 can provide a connection through local network 422 to a host computer 424 or to data equipment operated by an Internet Service Provider (ISP) 426. ISP 426 in turn can provide data communication services through the world wide packet data communication network now commonly referred to as the "Internet" 428. Local network 422 and Internet 428 can both use electrical, electromagnetic or optical signals that carry digital data streams. The signals through the various networks and the signals on network link 420 and through communication interface 418, which carry the digital data to and from computer system 400, can be example forms of transmission media.

Computer system 400 can send messages and receive data, including program code, through the network(s), network link 420 and communication interface 418. In the Internet example, a server 430 can transmit a requested code for an application program through Internet 428, ISP 426, local network 422 and communication interface 418. The received code can be executed by processor 404 as it is received, and/or stored in storage device 410, or other non-volatile storage for later execution. In some embodiments, server 430 can provide information for being displayed on a display.

Figure 5:
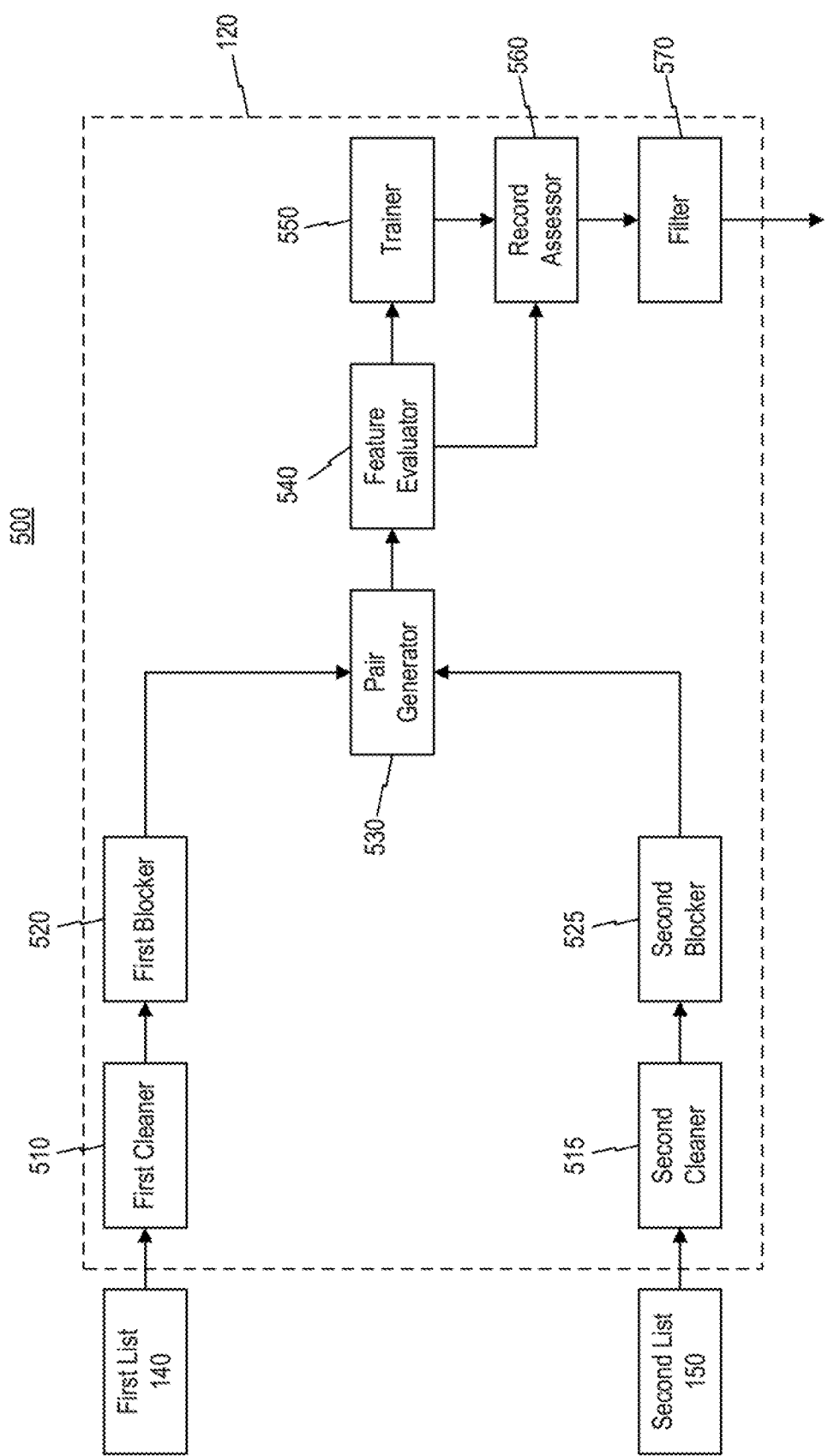
FIG. 5 is a block diagram representing an exemplary process for associating related records to common entities across multiple lists, consistent with embodiments of the present disclosure.

FIG. 5 is a box diagram representing an exemplary process for associating related records to common entities across multiple lists, consistent with embodiments of the present disclosure. The dotted region, labelled 120, represents an exemplary entity resolution system (e.g., entity resolution system 120 in FIG. 1). The exemplary process can acquire two lists on the order of millions of records (e.g., first list 140 and second list 150) and determine whether records in each list are related. The process can be used for at least one of data enrichment, data integration, and data duplication. Data enrichment refers to processes used to enhance, refine or otherwise improve raw data. Data integration involves combining data residing in different sources and providing users with a unified view of these data. Data duplication refers to determining whether a particular list has duplicate entries. While FIG. 5 provides an exemplary process flow for some embodiments of the present disclosure, it should be recognized by a person of skill in the art that not all steps need to be taken and that there can be additional steps.

As shown in FIG. 5, entity resolution system 120 can receive first list 140 and second list 150, which were described above in FIGS. 1-3. Entity resolution system 120 can then process first list 140 using a first cleaner 510 and a first blocker 520.

First cleaner 510 can apply one or more cleaning functions to first list 140. Exemplary cleaning functions can include making alphanumeric characters in each field lowercase, taking out punctuation from a field, taking out all numbers in a field, taking out everything but the numbers in the field, or switching "St" for "Street" or vice versa. Cleaning functions can be applied to the data in one or more fields in each record of first list 140. The cleaning functions can be used to normalize all of the records so that other functions can be more easily applied to first list 140. One or more cleaning functions can be chosen or determined automatically, by a user, or a combination thereof.

To illustrate the application of a particular cleaning function, a field can comprise a phone number of (987) 654-3210. A cleaning function can be applied to the field that would only keep the numbers, resulting in the field comprising 9876543210. Thus, when this field is compared with another field that has a similar cleaning function applied to it, there will only be numbers to compare. Another cleaning function that can be applied would be to add a number in front of the phone number. An example would be adding the number 1. The result of this cleaning function would be the field comprising 19876543210.

As shown above, after a cleaning function is applied, the data in the record of first list 140 can be altered by the cleaning function. In some embodiments, the data in the record of first list 140 will not be altered directly; but instead, either indicate that such cleaning function should be applied to the particular one or more fields in the future or associate the cleaned field with the original field in the first list 140. In some embodiments, the data in the record of first list 140 will not be altered at all; but instead, a new list will be created that includes the records with the cleaned fields.

After first list 140 has been cleaned in first cleaner 510, the cleaned records of first list 140 are provided to first blocker 520. First blocker 520 can reduce the number of comparisons necessary to determine if two records are related to a similar entity by reducing the number of relevant records. First blocker 520 assigns one or more records of first list 140 to one or more groups based on one or more fields. For example, an assignment can be based on phone number. In this example, if the phone number of a record in first list 140 matches the phone number of another record in first list 140, the two records would be assigned to the same group. Further, a record may not have a match; and thus would be assigned to a group comprising of itself.

An example of an assignment to a group based on one more than one field would be as follows. The assignment can be based on both the phone number and address. In this example, a record would only be put into a group with another record if both records have the same phone number and address.

In some embodiments, assignments can be based on a portion of a field. For example, an assignment to a group can be based on the first three numbers of a phone number. Thus, every record with the same first three numbers would be assigned to a particular group.

The group having the assigned records can be defined by a new list having those assigned records or by a number of pointers or other associations linking those assigned records to the group.

Entity resolution system 120 can also process second list 150 using a second cleaner 515 and a second blocker 525, which can provide similar functionality as those described above for first cleaner 510 and first blocker 520. While second cleaner 515 and second blocker 525 can provide similar functionality (e.g., cleaning and blocking), the application of that functionality may be different and may depend on how the data is stored in the fields of second list 150. For example, the field comprising (987) 654-3210 in first list 140 may be represented as 19876543210 in second list 150. For purposes of matching the data in the fields, it may be appropriate to clean or format the data so that the formatting of the data is consistent across both lists. If the desired end result is to compare a string of ten numbers, the field comprising (987) 654-3210 would need to have a cleaning function that removes everything but the numbers and the field comprising 19876543210 would need a cleaning function that removes the 1 from the front of the number.

Moreover, while FIG. 5 depicts two cleaners and two blockers, it is appreciated that only one cleaner and blocker may be used, wherein the cleaner and blocker each provide different instances based on whether the received input is the acquired first list 140 or the acquired second list 150. It is also appreciated that entity resolution system 120 does not include one or more cleaners as the formatting of data between first list 140 and second list 150 are consistent. Moreover, it is appreciated that cleaning can take place after blocking or pair generation.

After one or more records from first list 140 and second list 150 have respectively been assigned to one or more groups, entity resolution system 120 uses a pair generator 530 to process at least one group from first list 140 and at least one group from second list 150. Pair generator 530 can associate a record of the one or more groups from first list 140 with a record of a group in the one or more groups from second list 150, as further explained in FIG. 7. The respective groups of each record can be chosen because the one or more fields that the groups were grouped by were similar.

To pair these groups, pair generator 530 can perform a Cartesian product of the two groups. For example, a first group can comprise a first record and a second record while a second group can comprise a third record and a fourth record. The Cartesian product of the first group and the second group would be the entire first record with the entire third record, the entire first record with the entire fourth record, the entire second record with the entire third record, and the entire second record with the entire fourth record. The Cartesian product can also only pair relevant fields of each of the records rather than the entire records. Relevant fields can be determined through the blocking functions or some other determination.

Pairing can be accomplished with a separate data structure that comprises the two records that are paired together. Pairing can also be accomplished by associating the two records that are paired together without moving them to a new data structure.

In some embodiments, entity resolution system 120 can be split across one or more networked computers, communicatively coupled via a network (e.g., network 160). In some embodiments, the networked computers can be organized into a distributed computing architecture. For example, the distributed computing architecture can be a system such as Apache Hadoop. In these embodiments, for example, blocking functions (e.g., the blocking functions provided by first blocker 520 or second blocker 525) can run in parallel across the distributed clusters and can generate output keys for each record for use by pair generator 530. In some embodiments pair generator 530 and the remaining portions of entity resolution system 120 can continue on a single networked computer.

The paired lists are then processed in a feature evaluator 540. Feature evaluator 540 can evaluate a pair based on one or more of the fields in the records of the pair. The evaluation can be in the form of a numeric score or other evaluation type. The evaluation can be based on a computer generated or user specified function. For example, a pair can be evaluated by the difference in length of its first field. If the first field of the first record in the pair is "Trader Joes" and the first field of the second record in the pair is "Trader Jose," the evaluation by the difference in length of its first field would be 0.

Feature evaluator 540 can also evaluate a pair based on information that is external to either record in the pair, for example a distance between the addresses identified in each record of the pair. In this example, two records may have a field that represents an address. An evaluation can send the addresses to a separate process that calculates the distance between the two addresses. This kind of information is known as a global feature. A global feature can be added to a number of places, including the records of first list 140, the records of second list 150, a pair, or any combination thereof. The addition of global features can also occur at a number of places, including: before a list is in entity resolution system 120, when a list is in either first cleaner 510 or second cleaner 515, when a list is in first blocker 520 or second block 525, when a group is in pair generator 530, when a record is in feature evaluator 540, or any combination thereof.

Feature evaluator 540 can evaluate a pair one or more times. The one or more evaluation functions may or may not indicate similarity between the records. For example, an evaluation can be the number of words in a particular field. While such an evaluation may not indicate similarity between the records, this type of valuation may still be used in combination with other evaluations to determine similarity between the records.

After one or more evaluation functions are performed by feature evaluator 540, the one or more evaluations are associated with the pair that they are based on. The associations can be through a data structure that holds both records in the pair and the one or more evaluations. The associations can also be metadata or an indicator in the pair that points to the evaluations.

The pairs with the one or more evaluations can then be passed to a trainer 550, a record assessor 560, or some combination thereof. The trainer 550 can create a statistical model that can be applied in record assessor 560 to the pairs with the one or more evaluations. The statistical model can ultimately determine if a particular record is related to another record. A statistical model can also just be passed to record assessor 560, effectively bypassing trainer 550. A statistical model can be created through a machine learning model in trainer 550 based on a portion or all of the pairs with the one or more evaluations. The machine learning model can also be based on data not in the pairs or on past data of similar pairs.

The machine learning model can be a supervised, semi-supervised, unsupervised machine learning technique, or some combination thereof.

A supervised machine learning technique can require a user or some other information source to label each pair that the machine learning model can rely on. Labeling can come in many forms, including a binary indicator of matching or not matching, likelihood that the two records in the pair represent a similar entity, or some other indicator that would aid in determining whether two records are related to a similar entity. Examples of a supervised machine learning technique include decisions trees, bagging, boosting, and random forest.

A semi-supervised machine learning technique can reduce the number of pairs that a user or some other information source needs to label. An example of a semi-supervised machine learning technique is active learning. Active learning can involve inspecting the pairs and/or their corresponding evaluations to determine which one or more pairs entity resolution system 120 should inquire about. This inquiry can be provided to a user or some other information source so that one or more of these information sources can provide an input or label to the pair. The input or label can represent whether the user or some other information source deduces that the records of the pair are related to a similar entity. After the entity resolution system 120 receives labels for the one or more pairs, the machine learning model can show the user or other information source one or more other available pairs for labelling.

After the machine learning model has received, for example, a matching and non-matching label, the machine learning model can either show more pairs to the user or other information source or automatically label the remaining pairs. Examples of techniques to automatically label the remaining pairs include linear and logistic regression. A pair is informative to the machine learning model if it assists the machine learning model in determining whether two records are related to the same entity and can be based on the one or more evaluations that have been made on the pairs by feature evaluator 540.

In some embodiments, using the active learning approach, a matching and non-matching suggestion can be more easily recognized by the machine learning model in the beginning by taking the highest combined evaluations and the lowest combined evaluations for the first field in a record. This can increase the likelihood that the records shown to the user are a matching and not matching.

An unsupervised learning technique allows for no interaction from a user or other information source. Examples of an unsupervised machine learning technique include clustering.

In some embodiments, a trainer 550 can take a sample of the pairs from feature evaluator 540. The sample can be chosen by an algorithm, a user, randomly, or any combination thereof. There is no set size the sample must be. Some samples can be the size of the available memory. Other samples can be set at a specific number, for example 10,000 pairs. Still further, other samples can be set as a number that is determined by a function or process. When using a sample, a machine learning model can label the pairs in the sample or a portion of the pairs in the sample to create the statistical model.

The statistical model can output a score that represents the likelihood that the records in each pair are related to a similar entity. The score may be a number between 1 and 0, with 1 representing 100% likelihood that the records in the pair are related to the same entity and 0 representing 0% likelihood that the records in the pair are related to the same entity.

As was previously discussed, record assessor 560 receives the pairs with one or more evaluations from feature evaluator 540 associated with them and the statistical model in order to assess the likelihood that the records in each pair are related to a similar entity. Record assessor 560 applies the statistical model to the one or more evaluations of each pair. Because the sample of pairs has already been trained to the records, the process of scoring new pairs can be accomplished with relative ease using the statistical model.

Because trainer 550 can be based on pairs it has already seen, new pairs that are processed in record assessor 560 can update the statistical model to incorporate new records that it sees. Updates to the statistical model allow for increased precision of the system over time.

After the assessment in record assessor 560, the pairs with the scores can be filtered in a filter 570. Filtering can distinguish pairs that have a match probability above a certain threshold. Distinguishing the pairs can comprise of indicating in the records that they are associated with other records. Distinguishing can also comprise of gathering the pairs that have a match probability above a certain threshold in a data structure. The threshold can be user specified or automatically generated based on the output of record assessor 560.

After the pairs are distinguished in filter 570, filter 570 can provide a result based on the filtering. The result can be provided in a number of ways, for example, such as showing one or more matching records, a probability that the pair is associated with the same entity, or any combination thereof.

The result of filter 570 can also be used to resolve matching entities. Resolving matching entities may comprise combining records that are associated with the same records. Resolving matching entities can also comprise of grouping matching records into sets.

After the filtering stage, there can be a global optimization that would use matches between first list 140 and second list 150 to find a match in first list 140 or multiple matches of one record in first list 140 with second list 150.

Figure 6:
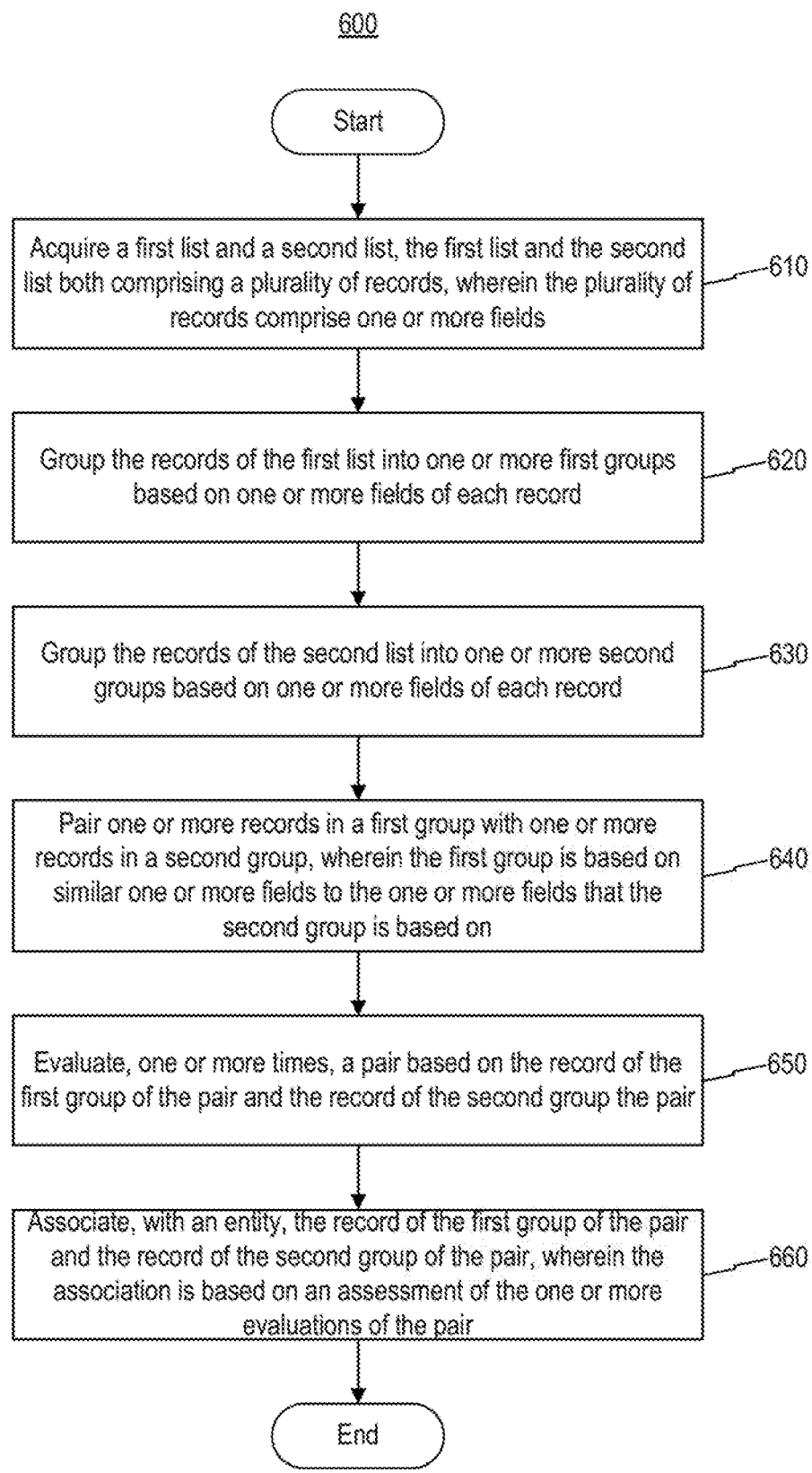
FIG. 6 is a flowchart representing an exemplary method for associating related records to common entities across multiple lists, consistent with embodiments of the present disclosure.

Similarly to the system, a method can be used to associate related records to common entities across multiple lists. FIG. 6 is a flowchart representing an exemplary method for associating related records to common entities across multiple lists, consistent with embodiments of the present disclosure. While the flowchart discloses the following steps in a particular order, it will be appreciated that at least some of the steps can be moved, modified, or deleted where appropriate, consistent with the teachings of the present disclosure. The associating can be performed in full or in part by an entity resolution system (e.g., entity resolution system 120). It is appreciated that some of these steps can be performed in full or in part by other components (e.g., such as client 110 identified above in FIG. 1).

FIG. 6 starts with acquiring a first list (e.g. first list 140) and a second list (e.g. second list 150), as shown in step 610. The first list and the second list can both comprise a plurality of records that each comprise one or more fields. The records of the first list are grouped into one or more first groups based on one or more fields of each record, as shown in step 620. The records of the second list are grouped into one or more second groups based on one or more fields of each record, as shown in step 630. The first groups and the second groups can be based on different one or more fields of each record. A record in a first group is paired with all of the records in a second group, as shown in step 640. When two groups are paired together, the respective groups can be similar. Similarity can be based on how the groups were initially formed. Thus, two similar groups can occur when a first group was based on one or more fields that are similar to the one or more fields a second group was based on. Further, the pairing can be based on a Cartesian product, as described above. After the pairing, a pair is evaluated one or more times, as shown in step 650. An evaluation of a pairs can be based on at least a portion of the record of the first group and at least a portion of the record of the second group. After the evaluations, the records of a pair are associated with an entity based on an assessment of the one or more evaluations of the pair, as shown in step 660.

Figure 7:
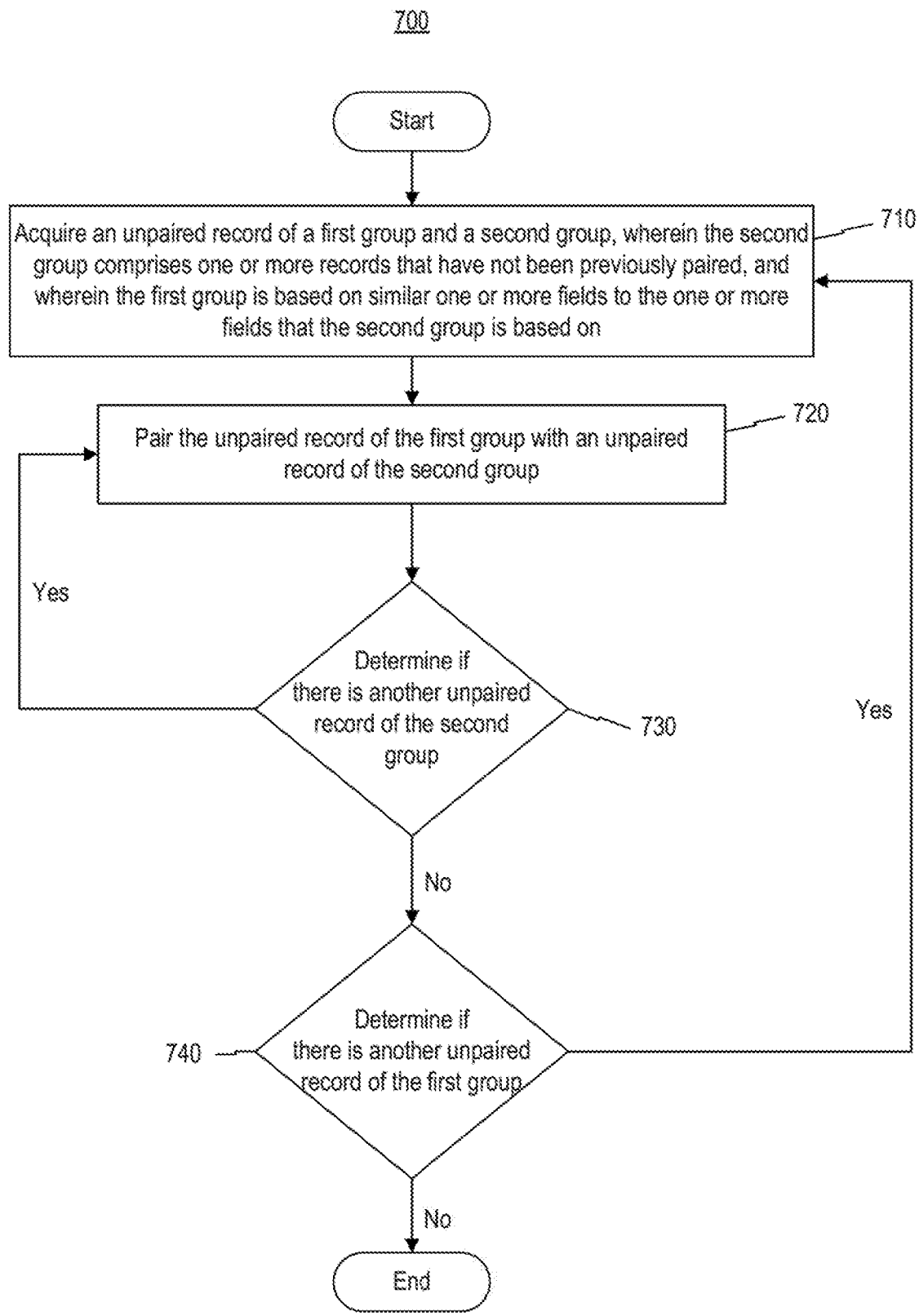
FIG. 7 is a flowchart representing an exemplary method for pairing one or more records of a first group with one or more second groups, consistent with embodiments of the present disclosure.

FIG. 7 is a flowchart representing an exemplary method 700 for pairing one or more records of a first group with one or more second groups, consistent with embodiments of the present disclosure. Pairing step 640 of FIG. 6 can be implemented using pairing method 700. While the flowchart discloses the following steps in a particular order, it will be appreciated that at least some of the steps can be moved, modified, or deleted where appropriate, consistent with the teachings of the present disclosure. The pairing can be performed in full or in part by an entity resolution system (e.g., entity resolution system 120). It is appreciated that some of these steps can be performed in full or in part by other components (e.g., such as client 110 identified above in FIG. 1).

First, an unpaired record of a first group and a second group are acquired, as shown in step 710. The second group can comprise one or more records that have not been previously paired. The first group can be based on similar one or more fields to the one more fields that the second group is based on. The unpaired record of the first group is paired with an unpaired record of the second group, as shown in step 720. Next, a determination is made regarding whether there is another unpaired record of the second group, as shown in step 730. If there is another unpaired record of the second group, the method goes back to step 720. If there is not another unpaired record of the second group, the method proceeds to step 740. In step 740, a determination is made regarding whether there is another unpaired record of the first group. If another unpaired record of the first group exists, the method can proceed to step 710. If, however, there is not another unpaired record of the first group, the method ends.

Figure 8:
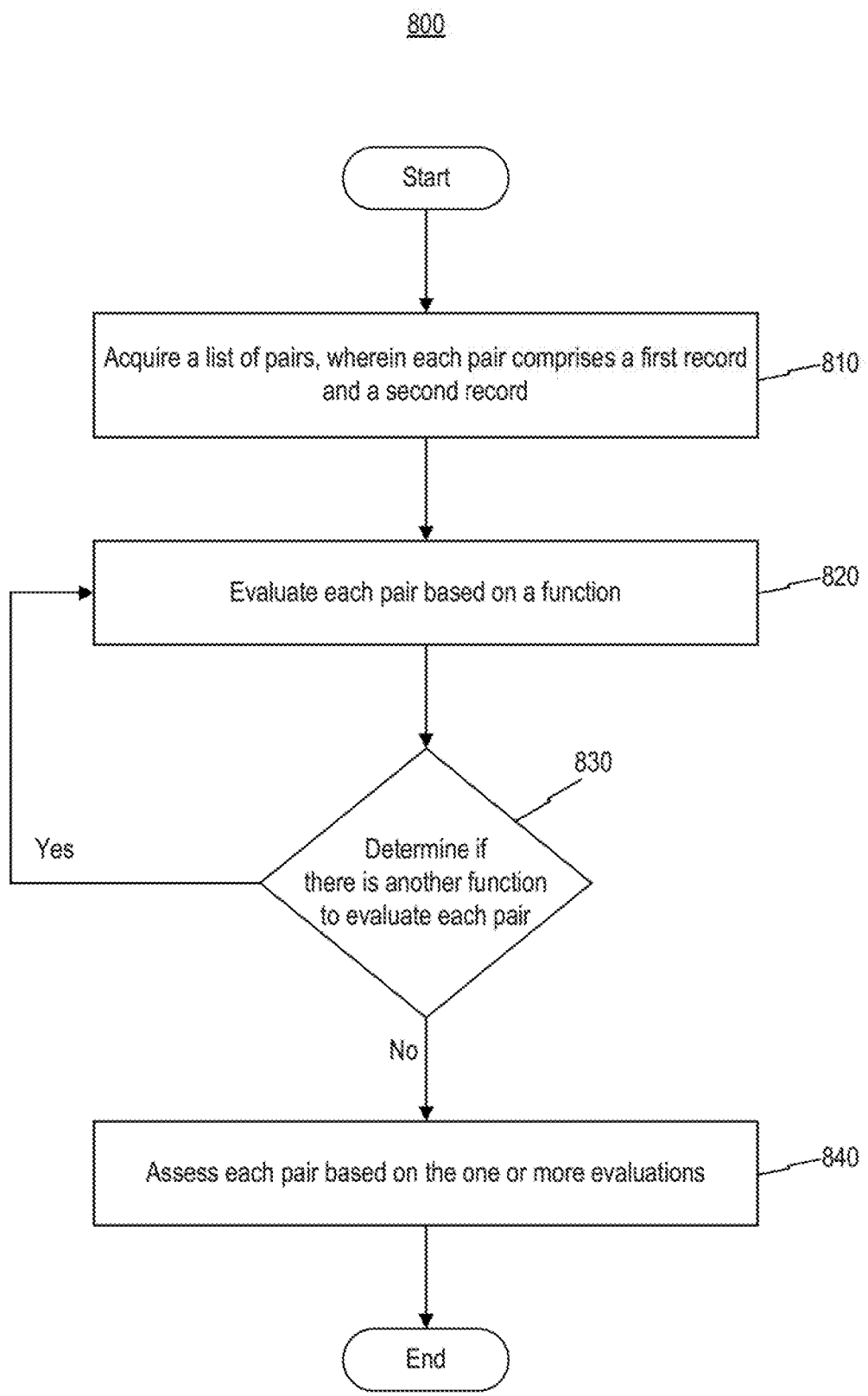
FIG. 8 is a flowchart representing an exemplary method for evaluating and assessing one or more pairs, consistent with embodiments of the present disclosure.

FIG. 8 is a flowchart representing an exemplary method 800 for evaluating and assessing one or more pairs, consistent with embodiments of the present disclosure. Evaluating step 650 and associating step 660 of FIG. 6 can be implemented using method 800. While the flowchart discloses the following steps in a particular order, it will be appreciated that at least some of the steps can be moved, modified, or deleted where appropriate, consistent with the teachings of the present disclosure. Method 800 can be performed in full or in part by an entity resolution system (e.g., entity resolution system 120). It is appreciated that some of these steps can be performed in full or in part by other components (e.g., such as client 110 identified above in FIG. 1).

First, a list of one or more pairs is acquired, as shown in step 810. The pairs can each comprise a first record and a second record. The first record and the second record may not include all of the fields of the respective records, but instead can include only the one or more fields that will be evaluated and assessed. The pair can then be evaluated by a function that is predefined either by a user or computer process, as shown in step 820. The evaluation can be any measurement of one or more fields of the records, including number of letters and number of words. The measurement may take the form of an enumerated class or of a numerical value. After the pair has been evaluated, the method of 800 includes associating the evaluation with the pair and determining if there is another function to evaluate the pair, as shown in step 830. If there is another function, the method will revert back to step 820. This allows for multiple evaluations to be conducted on a single pair. Each additional evaluation can be either further associated with the pair or combined with the previous one or more evaluations. After there are no more functions to apply to the pair, the method will assess the pair based on the one or more evaluations, as shown in step 840.

The method of 800 can be stepped through for each pair at a time. For example, a pair is evaluated by the one or more evaluations and then assessed based on the one or more evaluations. Also, a pair can be evaluated with two or more records at a time. For example, both a first pair and a second pair is evaluated either respectively or together with functions and then assessed either individually or together in step 840. The pair can also be evaluated and assessed in parallel.

Embodiments of the present disclosure have been described herein with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the specification and examples be considered as exemplary only, with a true scope and spirit of the present disclosure being indicated by the following claims. It is also intended that the sequence of steps shown in figures are only for illustrative purposes and are not intended to be limited to any particular sequence of steps. As such, it is appreciated that these steps can be performed in a different order while implementing the exemplary methods or processes disclosed herein.

What is claimed is:

1. A system for associating records across a first list and a second list to a common entity, the system comprising:
   one or more memory devices configured to store:
      a set of instructions; and
      a first list and a second list, wherein the first list and the second list both include a plurality of records associated with entities and the plurality of records includes one or more fields; and
   one or more processors configured to execute the set of instructions and cause the system to:
      obtain a plurality of record pairs, wherein each record pair of the plurality of record pairs includes a record from the first list and a record from the second list;
      label a subset of record pairs in the plurality of record pairs;
      generate a statistical model based on the labeled subset of record pairs;
      evaluate the plurality of record pairs based on the statistical model, the evaluation based on field lengths or information external to at least one of the plurality of record pairs associated with the one or more fields;
      output, based on the statistical model, scores representing probabilities of records in the plurality of record pairs being related to similar entities; and
      associate one or more of the plurality of records of the first list and one or more of the plurality of records of the second list with the similar entities.

2. The system of claim 1, wherein the set of instructions, when executed, further causes the system to filter record pairs of the plurality of record pairs having scores above a threshold score.

3. The system of claim 2, wherein the threshold score is determined based on the evaluation of the record pairs of the plurality of record pairs.

4. The system of claim 1, wherein the set of instructions, when executed, further causes the system to update the statistical model based on the output of the evaluated record pairs.

5. The system of claim 1, wherein the information external to the plurality of record pairs includes respective geographic locations, and the evaluation is based on a calculated distance between the respective geographic locations.

6. The system of claim 1, wherein the labeled subset of record pairs includes matching labels and non-matching labels.

7. The system of claim 1, wherein a label for a record pair is determined based on highest combined evaluations or lowest combined evaluations of a specified field of the plurality of records.

8. A method for associating records across a first list and a second list to a common entity, the method comprising:
   obtaining a first list and a second list, wherein the first list and the second list both include a plurality of records associated with entities and the plurality of records includes one or more fields;
   obtaining a plurality of record pairs wherein each record pair of the plurality of record pairs includes a record from the first list and a record from the second list;
   labeling a subset of record pairs in the plurality of record pairs;
   generating a statistical model based on the labeled subset of record pairs;
   evaluating of the plurality of record pairs based on the statistical model, the evaluating based on field lengths or information external to at least one of the plurality of record pairs associated with the one or more fields;
   outputting, based on the statistical model, scores representing probabilities of records in the plurality of record pairs being related to similar entities; and
   associating one or more of the records of the first list and one or more of the records of the second list with the similar entities.

9. The method of claim 8, further comprising filtering record pairs having scores above a threshold score.

10. The method of claim 9, wherein the threshold score is determined based on the evaluation of the record pairs of the plurality of record pairs.

11. The method of claim 8, further comprising updating the statistical model based on the output of the evaluated record pairs.

12. The method of claim 8, wherein the labeled subset of record pairs includes matching labels and non-matching labels.

13. The method of claim 8, wherein a label for a record pair is determined based on highest combined evaluations or lowest combined evaluations of a specified field of the plurality of records.

14. The method of claim 8, wherein the information external to the plurality of record pairs includes respective geographic locations, and the evaluation is based on a calculated distance between the respective geographic locations.

15. A non-transitory computer-readable medium of a computing system storing a set of instructions that, when executed by one or more processors of the computing system, cause the computing system to perform a method to associate related records across a first list and a second list to a common entity, the method comprising:
  obtaining a first list and a second list, wherein the first list and the second list both include a plurality of records associated with entities and the plurality of records includes one or more fields;
  obtaining a plurality of record pairs, wherein each record pair of the plurality of record pairs includes a record from the first list and a record from the second list;
  labeling a subset of record pairs in the plurality of record pairs;
  generating a statistical model based on the labeled subset of record pairs;
  evaluating the plurality of record pairs based on the statistical model, the evaluating based on field lengths or information external to at least one of the plurality of record pairs associated with the one or more fields;
  outputting, based on the statistical model, scores representing probabilities of records in the plurality of record pairs being related to similar entities; and
  associating one or more of the records of the first list and one or more of the records of the second list with the similar entities.

16. The non-transitory computer readable medium of claim 15, wherein the set of instructions, when executed, further causes the computing system to perform filtering record pairs having scores above a threshold score, wherein the threshold score is determined based on the evaluation of the record pairs of the plurality of record pairs.

17. The non-transitory computer readable medium of claim 15, wherein the set of instructions, when executed, further causes the computing system to update the statistical model based on the output of the evaluated record pairs.

18. The non-transitory computer readable medium of claim 15, wherein the information external to the plurality of record pairs includes respective geographic locations, and the evaluation is based on a calculated distance between the respective geographic locations.

19. The non-transitory computer readable medium of claim 15, wherein the labeled subset of record pairs includes matching labels and non-matching labels.

20. The non-transitory computer readable medium of claim 15, wherein a label for a record pair is determined based on highest combined evaluations or lowest combined evaluations of a specified field of the plurality of records.

* * * * *